United States Patent
Lin et al.

(10) Patent No.: US 6,211,859 B1
(45) Date of Patent: *Apr. 3, 2001

(54) METHOD FOR REDUCING PULSING ON LIQUID CRYSTAL DISPLAYS

(75) Inventors: Jian Lin, San Jose; Shih-hua Chang, Sunnyvale; Carrell R. Killebrew, Jr., Saratoga, all of CA (US)

(73) Assignee: Chips & Technologies, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/028,828

(22) Filed: Feb. 24, 1998

Related U.S. Application Data

(63) Continuation-in-part of application No. 08/814,569, filed on Mar. 10, 1997, now Pat. No. 6,034,663.

(51) Int. Cl.[7] ..................................................... G09G 5/10
(52) U.S. Cl. ............................................................. 345/147
(58) Field of Search ..................................... 345/147, 149, 345/152, 127, 89, 137, 138

(56) References Cited

U.S. PATENT DOCUMENTS

| | | | |
|---|---|---|---|
| 3,735,182 | 5/1973 | Dalton et al. | 313/188 |
| 3,845,243 | 10/1974 | Schmersal et al. | 178/7.3 D |
| 3,937,878 | 2/1976 | Judice | 178/7.3 D |
| 3,967,052 | 6/1976 | Judice | 178/6 |
| 4,021,607 | 5/1977 | Amano | 358/230 |
| 4,074,254 | 2/1978 | Belser et al. | 340/324 |
| 4,100,579 | 7/1978 | Ernstoff | 358/230 |
| 4,180,813 | 12/1979 | Yoneda | 340/784 |
| 4,193,095 | 3/1980 | Mizushima | 358/241 |
| 4,237,457 | 12/1980 | Houldsworth | 340/728 |
| 4,385,293 | 5/1983 | Wisnieff | 340/793 |
| 4,427,978 | 1/1984 | Williams | 340/784 |
| 4,486,785 | 12/1984 | Lasher et al. | 358/284 |
| 4,591,848 | 5/1986 | Morozumi et al. | 340/784 |
| 4,640,582 | 2/1987 | Oguchi et al. | 350/333 |
| 4,644,495 | 2/1987 | Crane | 364/900 |
| 4,648,050 | 3/1987 | Yamagami | 364/526 |
| 4,654,721 | 3/1987 | Goertzel et al. | 358/283 |
| 4,660,030 | 4/1987 | Maezawa | 340/784 |
| 4,688,031 | 8/1987 | Haggerty | 340/793 |
| 4,695,884 | 9/1987 | Anastassiou et al. | 358/163 |
| 4,706,077 | 11/1987 | Roberts et al. | 340/728 |
| 4,709,995 | 12/1987 | Kuribayashi et al. | 350/350 |

(List continued on next page.)

FOREIGN PATENT DOCUMENTS 2204174A 11/1988 (GB) .............................. G09G/3/36

Primary Examiner—Dennis-Doon Chow
Assistant Examiner—Amr Awad
(74) Attorney, Agent, or Firm—Thelen Reid & Priest LLP; Marc S. Hanish

(57) ABSTRACT

A method for displaying grey-scale images at a desired grey scale resolution up to the visible limit on a display having a matrix of pixels, includes the steps of: defining a plurality of control matrices, each of said control matrices having a size and equal to the desired grey scale resolution of the display, each position in each of said control matrices corresponding to a specific pixel of said display; defining a super matrix, each position in said super matrix corresponding to one of said plurality of control matrices and having an assigned number in a range equal to the desired grey scale resolution; turning on a selected number of pixels within each of said control matrices based upon the grey scale value of the pixel, the orientation of the pixels turned on based on the value of a circular queue of size equal to said desired gray scale resolution; and adjusting the starting value of said circular queue for each of said control matrices based upon the number contained in the position of the super matrix corresponding to each control matrix and the gray scale value of the incoming pixel.

33 Claims, 11 Drawing Sheets

U.S. PATENT DOCUMENTS

| | | | |
|---|---|---|---|
| 4,742,346 | 5/1988 | Gillette et al. | 340/793 |
| 4,743,096 | 5/1988 | Wakai et al. | 350/333 |
| 4,769,713 | 9/1988 | Yasui et al. | 358/236 |
| 4,775,891 | 10/1988 | Aoki et al. | 358/160 |
| 4,779,083 | 10/1988 | Ishii et al. | 340/767 |
| 4,791,417 | 12/1988 | Bobak | 340/784 |
| 4,805,994 | 2/1989 | Miyajima | 350/336 |
| 4,827,255 | 5/1989 | Ishii | 340/793 |
| 4,840,460 | 6/1989 | Bernot et al. | 350/333 |
| 4,860,246 | 8/1989 | Inoue | 364/900 |
| 4,872,059 | 10/1989 | Shinabe | 358/241 |
| 4,908,613 | 3/1990 | Green | 340/719 |
| 4,921,334 | 5/1990 | Akodes | 350/333 |
| 4,929,058 | 5/1990 | Numao | 350/333 |
| 4,956,638 | 9/1990 | Larky et al. | 340/701 |
| 5,053,764 | 10/1991 | Barbier et al. | 340/793 |
| 5,068,649 | 11/1991 | Garrett | 340/793 |
| 5,075,683 | 12/1991 | Ghis | 340/793 |
| 5,185,602 | 2/1993 | Bassetti, Jr. et al. | 340/793 |
| 5,245,328 | 9/1993 | Garrett | 345/149 |
| 5,252,959 | 10/1993 | Kono | 345/147 |
| 5,337,408 | 8/1994 | Fung et al. | 395/162 |
| 5,400,044 | 3/1995 | Thomas | 345/147 |
| 5,543,819 | 8/1996 | Farwell et al. | 345/150 |
| 5,821,915 | 10/1998 | Graham et al. | 345/138 |
| 5,844,532 * | 3/2000 | Silverbrook et al. | 345/89 |
| 6,034,663 * | 3/2000 | Killebrew, Jr. et al. | 345/147 |

* cited by examiner

Matrix 1

Matrix 2

METHOD FOR REDUCING PULSING ON LIQUID CRYSTAL DISPLAYS

CROSS-REFERENCE TO RELATED APPLICATION

This is a continuation-in-part of patent application Ser. No. 08/814,569, filed Mar. 10, 1997, now U.S. Pat. No. 6,034,663 and entitled, "Method for Providing Grey Scale Images to the Visible Limit on Liquid Crystal Displays", by inventors Carrell R. Killebrew, Jian Lin, and Shih-hua Chang, assignors to Chips and Technologies, Inc., a Delaware corporation.

BACKGROUND OF THE INVENTION

1. Field of the Invention

The present invention relates to computer displays and to liquid crystal computer displays. More particularly, the present invention relates to methods for reducing pulsing on liquid crystal displays.

2. The Prior Art

Numerous methods are known for producing grey-scale images on digital (i.e., on/off) displays with characteristics similar to super-twisted nematic (STN) liquid crystal displays (LCD). Modulating individual pixels by employing frame-rate-control (FRC) algorithms over time and by spatial dithering appear to be the preferred methods for realizing gray scale on displays with STN LCD and similar characteristics.

Prior-art methods producing such grey-scale images do not claim gray scale approaching the visible limit, but are usually limited to 16 gray shades when using FRC alone and to 64 gray shades when FRC and dithering are used in combination. The details of particular methods are not readily available in the literature.

These prior-art methods all suffer from one or more shortcomings. The disadvantages of these previous methods may be classified into three main categories: undesirable visual motion artifacts, undesirable visual static artifacts, and reduced gray shade fidelity.

Undesirable visual motion artifacts may be perceived as "shimmer," "crawl," "ripple," or "waterfalling." The terms used to describe these artifacts are descriptive of subjective perception and are not readily quantifiable. All observed implementations of previous methods (particularly FRC-based processes) have specific gray shade values ("sensitive gray shades") for which one of these artifacts is readily perceivable.

Another undesirable visual motion artifact may be perceived as "pulsing". Again, this is not readily quantifiable, but can be observed under certain sensitive gray shade orientations.

These sensitive gray shades will change from one specific STN LCD panel model to another as a result of differences in panel physical characteristics. Because of this variability among different displays, systems employing these displays have to be tuned to achieve the best result given a combination of the gray scale method and the physical display employed. This normally involves changing the specific FRC implementation and may optionally involve remapping from a sensitive gray shade to an adjacent one that is insensitive, i.e., a gray shade which does not have an undesirable visual motion artifact. Remapping sensitive gray shades to avoid undesirable visual motion artifacts also reduces gray shade fidelity and resolution.

FRC-based motion artifacts are caused by the cyclic nature of the FRC as applied over a small physical area. For a given frame, the FRC is used to assign a value to a pixel within a grid or matrix. This value is compared to the gray shade to determine if the pixel should be "on" or "off." If neighboring pixels cycle harmonically in time with respect to each other, the human eye may perceive motion where none is intended. Virtually all visual motion artifacts are undesirable.

Undesirable static artifacts may be the result of sacrificing spatial resolution to achieve increased perceived gray shades by employing a spatial dithering process. The most noticeable static artifact in spatially-dithered grey scale images is "graininess." If a source gray shade cannot be directly represented, the display system may map the gray shade alternately into the two closest gray shades by dithering. The gritty appearance is caused by high frequency transitions between physically adjacent pixels at a physical resolution the eye can distinguish.

Reduced gray shade fidelity can be manifested as "contouring", also known as Mach banding or "cartooning." For example, contouring causes a smoothly shaded sphere to appear as a series of concentric rings each of a single gray shade. In cartooning, an image has a narrow enough gray shade or color range that images appear to have been drawn with crayons for use in cartoons. Contouring and cartooning are all apparent in processes having a capacity of fewer gray shades than the perceivable visible limit, which is 256 grey shades.

BRIEF DESCRIPTION OF THE INVENTION

The purpose of the present invention is to provide the capability to display gray scale to the limit of human perception (256 shades) using displays having characteristics of or ones similar to super-twisted nematic (STN) liquid crystal displays (LCD), while reducing pulsing problems. The present invention may be utilized for monochromatic or color displays.

A method is provided according to the present invention for displaying gray scale up to the visible limit (two hundred and fifty-six shades) for displays such as, but not limited to, dual-scan super twisted nematic (DSTN) liquid crystal displays (LCD). The method of the present invention employs a large static matrix of values in concert with a circular queue consumption to distribute energy evenly in both space and time to achieve a large range of gray shades in digital displays with slow rates of response. The grey scale resolution of the method of the present invention depends upon the size of the matrix employed. The gray shades are realized in the present invention by cycling individual pixels on and off within a sequence of frames. The length of the sequence is equal to the gray scale resolution. For example, if the desired gray scale resolution is N, to realize gray scale shade M, a pixel is on M frames in every N frames, or the duty cycle is M/N.

A first part of the method addresses minimizing visual motion artifacts and equal distribution of energy over the viewing surface. This is accomplished by assigning values to a matrix. According to the first part of the method of the present invention, a matrix is defined wherein each position in the matrix contains a different number or value. For example, each position in a 16×16 matrix is defined by a different numbered value from 0 to 255. This matrix is repeatedly mapped into the entire pixel matrix of the display in both the horizontal and vertical directions.

Static visual artifacts may be minimized by rotating the matrix columns at the beginning of each vertically adjacent matrix. For example, in 16×16 matrix, the first matrix in a row includes in order columns 0 through 15. In an embodiment where the column offset is 4, the first row of matrices below begins with column 4 and ends with column 3. The second row of the matrices below begins with column 8 and ends with column 7.

The second part of the process primarily defines the consumption or use of the pixels within the matrix to realize smooth shading of an individual pixel over time. This is accomplished by using a circular queue. The circular queue causes pixel consumption in sequential matrix address order, and provides that within any given number of frames that pixels are used with an even distribution. Each color primary has an independent circular queue per shade. Circular queues for each shade of each color primary may be in arbitrary alignment with respect to each other in order to achieve optimal visual results.

The gray-scale value of the pixel and the frame number within a sequence of frames is used to select a range of matrix values from a circular queue (the "ON" range). The location of the current pixel is used to determine the matrix value of the current pixel. The matrix value of the current pixel is compared to the "ON" range. If the current pixel's matrix value is within that range, then it is switched "ON" for that frame. The default state for failing this test is "OFF."

This method is duplicated for each color primary. The number of frames in a sequence is equal to the number of locations and values in each matrix.

The present invention provides gray shade resolution at the visible limit and therefor does not introduce gray shade infidelities. Dithering is not used, and thus its attendant artifacts do not occur. Motion artifacts are avoided in the present invention by assigning a static value to each pixel within a matrix and by making the matrix physically large enough so that the eye has difficulty perceiving motion. The decision to turn a pixel "on" or "off" is made by comparing the pixel's matrix value against a range of values (the "ON range"). If the pixel's matrix value is within the ON range, the pixel is turned "on." The on range is determined for each gray shade and each frame. Avoidance of motion artifacts is also assisted by the large cycle time of the process. For comparison, FRC-based processes typically run over a sixteen frame cycle, while the method of the present invention uses a two hundred fifty-six frame cycle, thus spreading low frequency events over a long sample interval with a high sample rate.

Pulsing is reduced through the use of a supermatrix as well as through use of shade shifting. A supermatrix is defined with positions representing a plurality of the matrices. Each position in the supermatrix contains a number. The number within the supermatrix is then used to alter the starting value of the circular queue. This reduces the possibility of having the same or similar orientations for different matrices within the supermatrix at any particular point in time. Shade shifting is accomplished by altering the starting value of the circular queue based upon the gray scale value of the incoming pixel. This reduces the chance that the similar colors will have the similar orientations at any particular point in time. Combining these techniques provides for greatly reduced possibilities of pulsing.

BRIEF DESCRIPTION OF THE DRAWING FIGURES

FIGS. 1a and 1b are examples of two matrices actually used with an embodiment of the present invention.

DETAILED DESCRIPTION OF THE PREFERRED EMBODIMENT

Figure 2A:
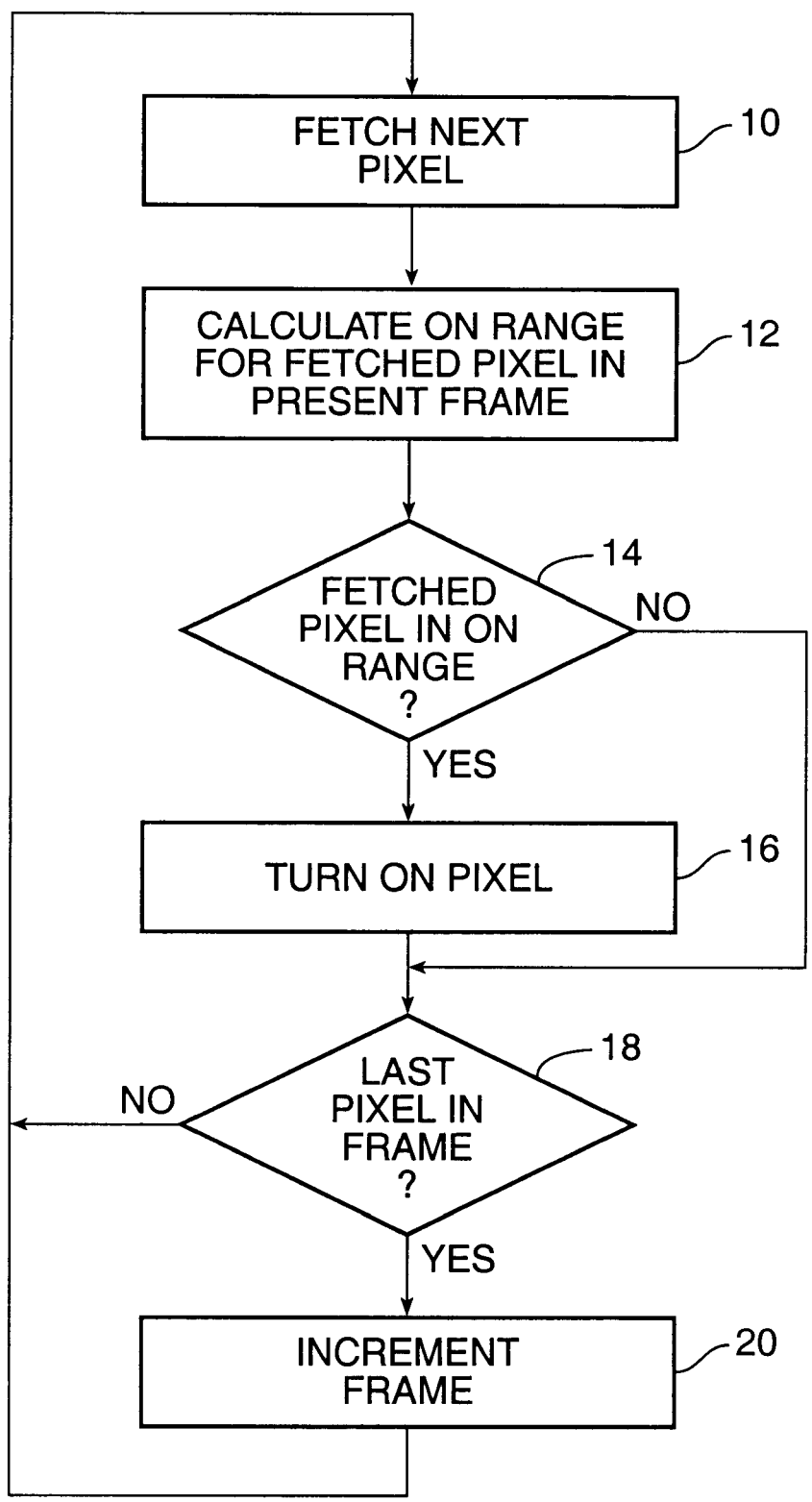
FIG. 2A is a flow diagram illustrating the method for consumption of pixels according to a presently preferred embodiment of the present invention

Those of ordinary skill in the art will realize that the following description of the present invention is illustrative only and not in any way limiting. Other embodiments of the invention will readily suggest themselves to such skilled persons.

For the purposes of the disclosure and claims herein, the term "digital display" refers to a display wherein each pixel may be either "ON" or "OFF". Examples of such displays include, but are not limited to, dual-scan super twisted nematic (DSTN) liquid crystal displays (LCD) and other displays having similar characteristics.

It should be noted at this point that the term pixel can take on more than one meaning. Some in the industry use the term pixel as in reference to the smallest part of the digital display. If a digital display can be thought of as a group of, say, several million light bulbs, this use of the term pixel would refer to just one light bulb. However, with recent advances in displaying shades of grays and colors, it has come to being that several "light bulbs" are grouped together as a single addressable unit. This unit is then instructed as to what color or shade to display at a particular point in time, and turns on a corresponding number of its bulbs. This unit is sometimes referred to as a pixel. The industry has not come to terms on a single definition of the term pixel. Throughout this application, the term pixel may be used to mean either the smallest part of the digital display (a single light bulb), or the smallest individually addressable part of the display (a unit of light bulbs). The context of its use, however, will make clear which type of pixel is being referred to. For example, when the reference is to the gray scale value of the pixel, pixel refers to the smallest individually addressable part of the display. However, when the reference is to turning on a pixel, pixel refers to the smallest part of the digital display.

It is not clear that prior-art grey scale display methods utilized the physical characteristic of STN LCD type displays in an advantageous manner. It appears that the prior-art methods used assumed the display's physical characteristics to be undesirable. The method of the present invention seeks to take advantage of the relatively slow rate of change of STN LCD type displays as a means for assisting in the even distribution of energy for a given gray shade over a large area.

The method of the present invention employs a matrix of values and circular queue method of consuming those values. Similar results are believed to be achievable with matrix assignments of values different from the illustrative ones disclosed herein.

According to the method of the present invention, both spatial and temporal aspects of the display technology are advantageously utilized to achieve a grey scale resolution which may be four times that of conventional prior art grey scale display systems. The total area of the display is divided into a plurality of matrices. In the illustrative embodiment disclosed herein, each matrix is a 16×16 pixel area of the display. According to another aspect of the method of the present invention, the matrix is repeated in the horizontal and vertical directions, but may be altered from repetition to repetition in order to minimize certain artifacts which might otherwise arise as a result of unintended periodicity.

A method is provided according to the present invention for displaying gray scale up to the visible limit (two hundred and fifty-six shades). The method of the present invention employs a large static matrix of values in concert with a circular queue consumption to distribute energy evenly in both space and time to achieve a large range of gray shades in digital displays with slow rates of response. The grey scale resolution of the method of the present invention depends upon the size of the matrix employed. The gray shades are realized in the present invention by cycling individual pixels on and off within a sequence of frames. The length of the sequence is equal to the gray scale resolution. For example, if the desired gray scale resolution is N, to realize gray scale shade M, a pixel is on M frames in every N frames, or the duty cycle is M/N.

Figures 1A, 1B:
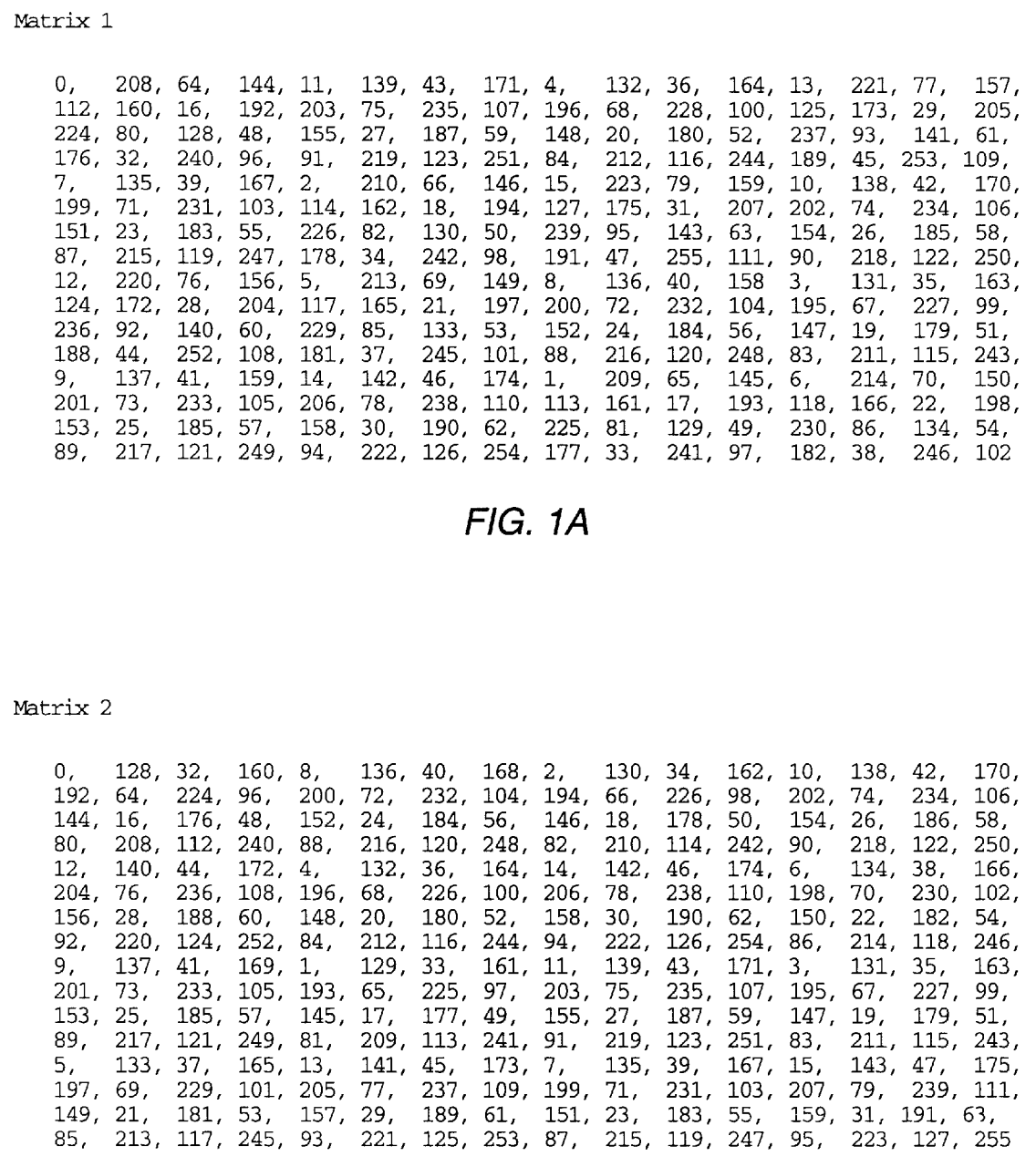

A first part of the method addresses minimizing visual motion artifacts and equal distribution of energy over the viewing surface. This is accomplished by assigning values to a matrix of pixels. According to the first part of the method of the present invention, a matrix is defined wherein each position in the matrix contains a different number or value. For example, each position in a 16×16 matrix contains a different numbered value from 0 to 255. This matrix is repeatedly mapped into the entire pixel matrix of the display in both the horizontal and vertical directions. Examples of two matrices which have been actually used with an embodiment of the present invention are presented in FIGS. 1a and 1b In order to avoid motion artifacts, it is preferable according to the present invention to employ several guidelines for assigning values in the control matrix. These guidelines are not strict rules and may be violated in isolated instances without adversely affecting the performance of the present invention. The application of these guidelines may be seen by examining the adjacent values of the matrices of FIGS. 1a and 1b.

First, it is preferable to avoid placing two consecutive values next to each other in the horizontal, vertical or diagonal directions. The 8 pixels surrounding an assigned pixel value in the control matrix should not have a consecutive value. A discreet incidental violation, like once out of a sequence may not cause a problem.

Second, placing consecutive number values on the same row, column, or diagonal should be avoided. For example, if the pixel in the upper left corner is assigned a value of 0, and then a pixel is skipped horizontally, the next pixel should not be assigned number 1.

Third, the distribution of the values in the matrix should be even from top to bottom and left to right. For example, if a 16×16 matrix is split vertically, where there are 128 values on the left half and 128 values on the right half, out of the 256 possible values (0–255), it is preferred to have approximately even distribution of values of 127 or less on both the right and left halves of the matrix. The same guideline is preferred for distribution of values between the top and bottom halves of the matrix.

Those of ordinary skill in the art will appreciate that these guidelines should be applied to adjacent pixels across horizontal and vertical matrix boundaries.

Because of the nature of the digital displays such as the STN LCD panel, they tend to exhibit cross talk. When a pixel is turned on or off, the signal sent to that pixel can leak or bleed to adjacent pixels. This may tend to cause annoying static visual artifacts, one of which is manifested as vertical bars of slightly different intensity. This artifact is not noticeable as a phenomenon when the image is a natural image such as a photograph, but when it is an image with highly repetitive content, such as a window background in a computer generated screen, intensity bars or variations in the intensity may appear as vertical bars.

Such static visual artifacts may be minimized by rotating the matrix columns at the beginning of each vertically adjacent matrix. For example, where a 16×16 matrix providing for 256 grey shades is used, the matrices in lines 0 through 15 include in order columns 0 through 15. In an embodiment where the column offset value is 4, the matrices in lines 16 through 31 (the second set of matrices from the top) begin with column 4 and end with column 3. The third set of matrices from the top begin with column 8 and end with column 7. While in the above example, the rotation value is 4, the column rotation value may be programmable according to the present invention so that minor adjustments may be made as needed.

Persons of ordinary skill in the art will observe that, while for ease of both understanding and implementing the present invention, square matrices are preferred, other matrix configurations may be employed without departing from the spirit of the present invention. Some of such other configurations will be non-optimal, however, due to the difficulty of predicting the behavior of neighboring pixels.

The second part of the process primarily addresses the consumption or use of the pixels within the matrix to realize smooth shading of an individual pixel over time. This is accomplished by using a circular queue. The circular queue causes pixel consumption in sequential matrix value order, and provides that within any given number of frames that pixels are used with an even distribution. Each color primary has an independent circular queue per shade. Circular queues for each shade of each color primary may be in arbitrary alignment with respect to each other in order to achieve optimal visual results.

The gray-scale value of the pixel and the frame number within a sequence of frames is used to select a range of matrix values from a circular queue (the "ON" range). The matrix value of the current pixel is compared to the "ON" range. If the current pixel's matrix value is within that range, then it is switched "ON" for that frame. If the current pixel's matrix value is outside of that range, then it is switched "OFF" for that frame. This method is duplicated for each primary color. The number of frames in a sequence is equal to the number of locations or the number of values in each matrix.

The circular queue is a modulo N list of the control matrix values in ascending order, where N is the desired grey scale resolution. The queue recycles back to the beginning when it reaches its end, i.e., in a 256 location matrix having values 0–255, the value following 255 is 0.

The ON range of values is changed for each frame. According to a presently preferred embodiment of the invention, the extent of the ON range is equal to the grey scale value of the incoming pixel and for each frame its starting point is incremented by that grey scale value. In each frame, the starting point of the On range is generated by multiplying the current incoming pixel's grey sale value with the frame number then adding an offset. In general, the range of values is determined by:

$$Rmin=[FG+Offset] \bmod N \quad [Eq. 1]$$

and $$Rmax=[Rmin+(G-1)] \bmod N \quad [Eq. 2]$$

where Rmin is the starting point of the ON range, Rmax is the ending point of the On range, G is the grey scale value of the incoming pixel, F is the frame number, and N is the desired grey scale resolution. For G=0, Rmin/Rmax are ignored and zero is output to the display. Offset is used for multicolor displays, as will be disclosed herein. For black and white displays, the value Offset can have any value.

As an example of the ON range value assignment, assume a grey scale resolution of 256 grey shades, and an incoming pixel having a grey scale value of 64 (one-quarter of full scale in a range of 0–255). Table 1 illustrates the ON range in successive ones of the 256 frames with zero offset. The 256 frames are conveniently referred to as F0–F255.

TABLE 1

| Frame Number | ON Range |
| --- | --- |
| F0 | 0–63 |
| F1 | 64–127 |
| F2 | 128–191 |
| F3 | 192–255 |

Those of ordinary skill in the art will recognize that any control matrix value between 0 and 255, which is assigned to corresponding pixels of the display, will evenly fall into the ON range 64 times in every 256 frames. Thus, each pixel with an incoming grey scale value of 64 will be evenly turned on 64 frames out of 256 frames.

As another example, Table 2 illustrates the ON range in successive ones of the 256 frames for a pixel with a grey scale value of 254 with zero offset.

TABLE 2

| Frame Number | ON Range |
| --- | --- |
| F255 | 2–255 |
| F0 | 0–253 |
| F1 | 254–251 |
| . | . |
| . | . |
| . | . |
| F254 | 4–1 |
| F255 | 2–255 |
| F0 | 0–253 |

In general, for a grey scale value "G" in grey scale resolution N, any control matrix value will evenly fall into the ON range G times in a sequence of N frames. Thus, each pixel with an incoming grey scale value G will be turned on G times out of every N frames. Persons of ordinary skill in the art will appreciate that the consumption of the values in time is always very periodic. By choice, a matrix value layout is selected that minimizes or avoids the common motion visual artifacts.

Persons of ordinary skill in the art will recognize that the grey scale value of any given pixel in a moving image on the display will likely change from frame to frame. As shown in Eq. 1, the calculation for the starting point of the ON range employs only the current frame number and the grey scale value of the instant incoming pixel. The grey scale value of the incoming pixel at that location in the display in the previous frame is irrelevant.

Referring now to FIG. 2A, a flow diagram illustrates the pixel consumption method of the present invention. First, at step 10, the grey scale value for the current pixel to be displayed is fetched from an appropriate place in the pixel pipeline. Next, at step 12, the ON range in the current frame for that pixel is calculated at step 12.

At step 14, the matrix value of the pixel to be displayed is compared with the ON range for the current frame calculated in the previous step. If the matrix value of the pixel is in the ON range, that pixel is turned on at step 16. After step 16, or if the matrix value of the pixel to be displayed is not within the ON range, the process proceeds to step 18 where it is determined if the current pixel is the last pixel in the current frame. If not, process control is transferred back to step 10 to process the next pixel. If the current pixel is the last pixel in the current frame process control is transferred to step 20 where the frame number is incremented. Process control is then transferred back to step 10 to process the first pixel in the next frame.

In a color digital display, this pixel consumption method described herein is duplicated for each color primary. A problem may be encountered if the ON range in the circular queue is started at the same point for each gray shade for each of the red primaries, the green primaries and the blue primaries. The on points and off points for all the red, green and blue shades will coincide. It is possible that because of the intensity of the red, green, and blue turning off or on at the same time, a more noticeable pulsing effect would occur.

In order to avoid such artifacts, the ON ranges are offset for each color primary in the display, as indicated by the variable "Offset" in Eq. 1. In the above examples, the ON range at F0 started at value 0. If the above examples are assumed to relate to a first primary color in a digital display, the F0 starting values for the ON ranges for the other two primary colors would be offset. In an actual 256 frame system fabricated according to the present invention, the ON ranges for F0 of the second and third primary colors are offset equally so that the F0 ON range for the second primary color begins at 85 and the F0 On range for the third primary color begins at 170. The values 0, 85, and 170 are each spaced apart by approximately one third of the total address value range of 0–255. According to a presently preferred embodiment of the invention, the color starting point offsets may be programmable so that other values may be selected for the offset.

Another visual artifact that can present problems for certain images is known as "pulsing". Implementing simply the methods listed above, it is possible for the screen to appear to be cycling between dim and bright levels when viewing a static image. This phenomenon occurs mostly on large display screens and is best explained with an example. For a given matrix a level of grey scale is displayed. For a mid-level red color, the grey scale level may indicate that half of the pixels in that matrix should be turned on and half turned off (a 128 out of 256 red). Since the above methods work by shifting which 128 pixels out of the 256 in the matrix are turned on at a specific point in time, and then altering that orientation over time, it is possible to have a situation where, at one point in the cycle, the 128 level red is displayed by turning all of the pixels in the top half of the matrix on, while leaving all of the pixels in the other half off, and at another point in the cycle having the "on" pixels spaced out evenly between the "off pixels". While on a matrix scale, this does not present a problem, if the screen is displaying the same color (or only varying the color slightly) across a large portion of the screen, it may be perceived by the human eye as if the color is alternating between brighter and darker levels, even though nothing has changed within each matrix except for the orientation of the pixels (i.e. the same number of pixels per matrix is maintained).

This phenomenon only seems to occur when viewing an image over a large physical area. Therefore, it presents a problem mainly with larger screens. Images such as a shot of a snow-filled mountain would then present a problem on these large screens since there would be a large amount of one color (white) in the picture. The brightness of this white may appear to the eye to be changing simply because the matrices have altered the orientations of the pixels.

There are two methods that can be used to overcome this "pulsing" problem. The key to both methods is in altering the manner in which the circular queues cycles through the frames for each matrix so that there is variety in the orientations of similar or identical colors from matrix to matrix at any particular point in time. The result of this is that when viewed over time, the color will not appear to be alternating from dim to bright but will appear as it should, one static brightness level.

The first method to solve this "pulsing" problem is to create a super matrix. Each super matrix can be filled with a plurality of the "normal" matrices as defined in the methods above. In the presently preferred embodiment of the invention, each super matrix would be 16×16 (representing 256 matrices). A unique value could be assigned to each of these 256 matrices in a fixed way. This super matrix would appear very much like a "normal matrix" (as depicted in FIGS. 1A and 1B). However, instead of each element representing a pixel's matrix value. Each element in the supermatrix would represent the starting value (or the starting frame) for the circular queue for the corresponding matrix. Thus each matrix within the super-matrix would begin its circular queue at a different frame number.

In practice, this can be accomplished by adding a variable $S_m$ to the equation for Rmin, arriving at Rmin=[(FG+$S_m$ Offset] modulo N. As discussed above, Rmin still represents the starting point of the ON range. $S_m$ represents the starting value of the circular queue. This starting value could then be altered for each specific matrix by assigning the value contained in the super matrix at the position corresponding to the particular matrix.

The effect of using this "supermatrix" method is that the same color is not oriented in the same way at a particular point in time within the supermatrix. This greatly reduces the possibility of a user perceiving a pulsing.

Another method that can be used to overcome the pulsing problem is to shift the shades. In this method, the system is designed so that for a particular shade of each color, there is a different offset value. For example, for red 1, an offset of 1 could be used. For red 128, an offset of 128 could be used. The effect of this shade-shifting on a large scale would mean that for slightly different colors, the offsets in the respective circular queues would be different so that their orientations would be significantly different enough at each point in time so that the "pulsing" effect would not occur.

In practice, this can be accomplished by adding a variable $S_s$ to the equation for Rmin, arriving at Rmin=[FG+$S_s$+ Offset] modulo N. As discussed above, Rmin still represents the starting point of the On range. $S_s$ represents the starting value of the circular queue. This starting value could then be altered each time the gray scale value of the incoming pixel is changed. The simplest way to do this is to have $S_s$ be equal to the gray scale value itself. However, one of skill in the art will recognize that this can be accomplished by any method that provides for different starting values for different colors.

Since the underlying physiological causes on the pulsing effect are not known, it is advantageous to utilize both of these methods as a single method hardwired into whatever hardware is being used. If the designer so wishes, this can be accomplished in such a way so that the exact implementation of the methods can be altered after manufacturer, allowing for more flexibility should pulsing problems become evident at a later stage. This can easily be accomplished by providing for a super matrix as defined earlier, while having the following formula for the beginning of the range of values: Rmin=[FG+$S_s$+Offset] modulo N. This allows both techniques to affect the starting position of the range of values and provides for the utmost flexibility for post-manufacture changes.

Figure 2B:
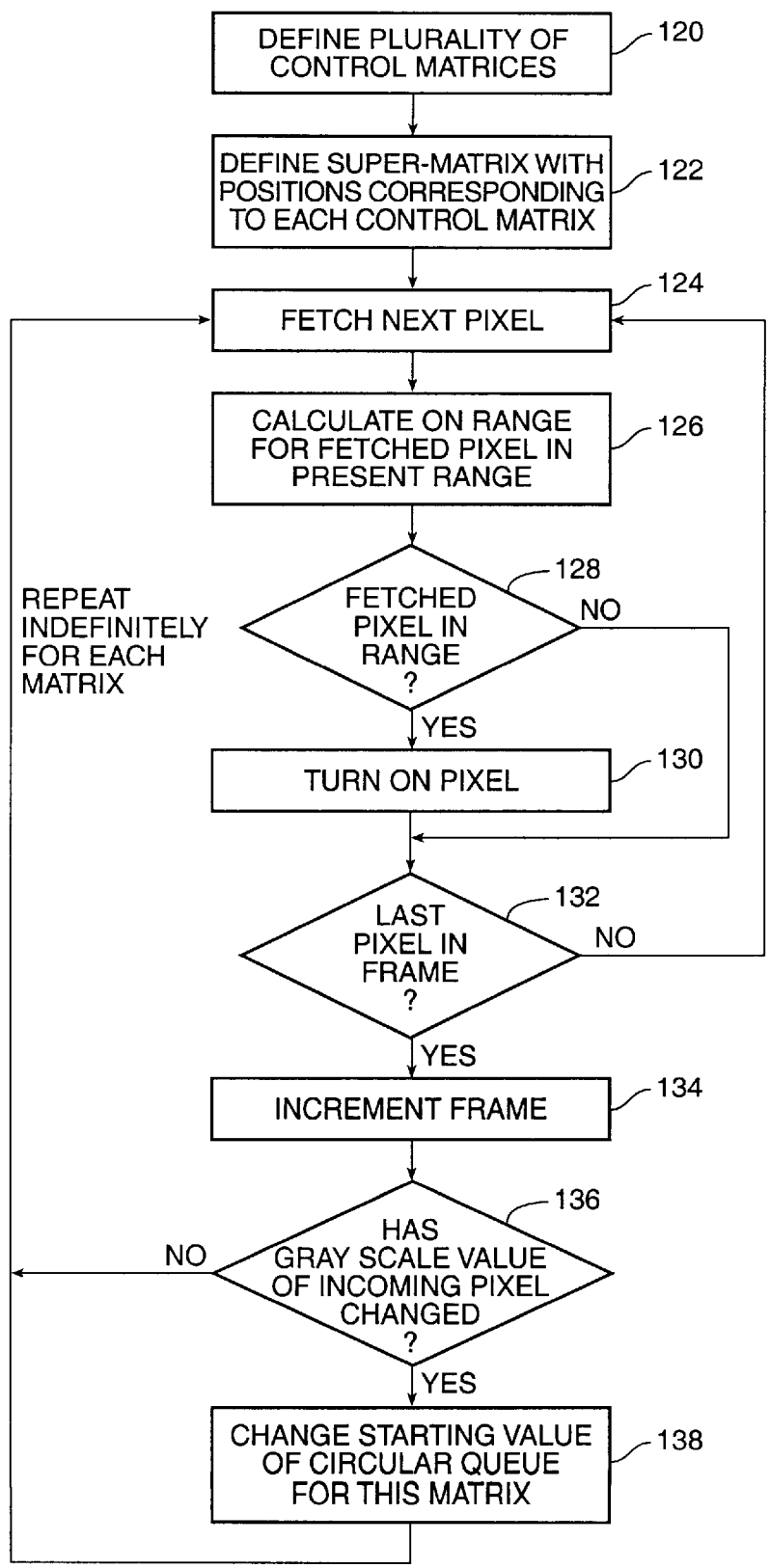
FIG. 2B is a flow diagram illustrating the method for displaying grey-scale images at a desired grey scale resolution on a display in such a way as to reduce pulsing, according to a presently preferred embodiment of the present invention.

Referring now to FIG. 2B, a flow diagram of the method for displaying grey scale images at a desired grey scale resolution while reducing pulsing is depicted. First, a plurality of matrices is defined at step 120. Then a super matrix is defined at step 122, where the positions in the super matrix correspond to each of the plurality of matrices. Then, at step 124, the current pixel to be displayed is fetched from an appropriate place in the pixel pipeline. Next, at step 126, the ON range, in the current frame is calculated.

At step 128, the matrix value of the pixel to be displayed is compared with the On range for the current frame calculated in the previous step. If the pixel's matrix value is in ON range, that pixel is turned on at step 130. After step 130, or if the matrix value of the pixel to be displayed is not within the ON range, the process proceeds to step 132 where it is determined if the current pixel is the last pixel in the current frame. If not, process control is transferred back to step 124 to process the next pixel. If the current pixel is the last pixel in the current frame process control is transferred to step 134 where the frame number is incremented. At step 136, if the grey scale value of the incoming pixel has not changed, the process is returned to step 124. Otherwise, the starting value of the circular queue for this matrix is changed at step 138. Then the process is returned to step 124. The process from step 124 on is repeated over and over indefinitely for each pixel.

For comparison, FRC-based processes typically run over a sixteen frame cycle, while the method of the present invention uses a two hundred fifty-six frame cycle, thus spreading low frequency events over a long sample interval with a high sample rate.

The method of the present invention does introduce two different artifacts, referred to herein as "sparkle" and "darkle." Sparkle may be manifested at very low valued gray shades when physically separated individual pixels cycle partially on and then decay to the off state. The darkle artifact is the opposite of sparkle. Darkle occurs at very high valued gray shades when physically separated individual pixels are allowed to cycle partially off. Sparkle and darkle occur over such small gray scale ranges and at such low thresholds of discrimination that they are preferable artifacts in comparison to all of the artifacts of previous methods.

Figure 3:
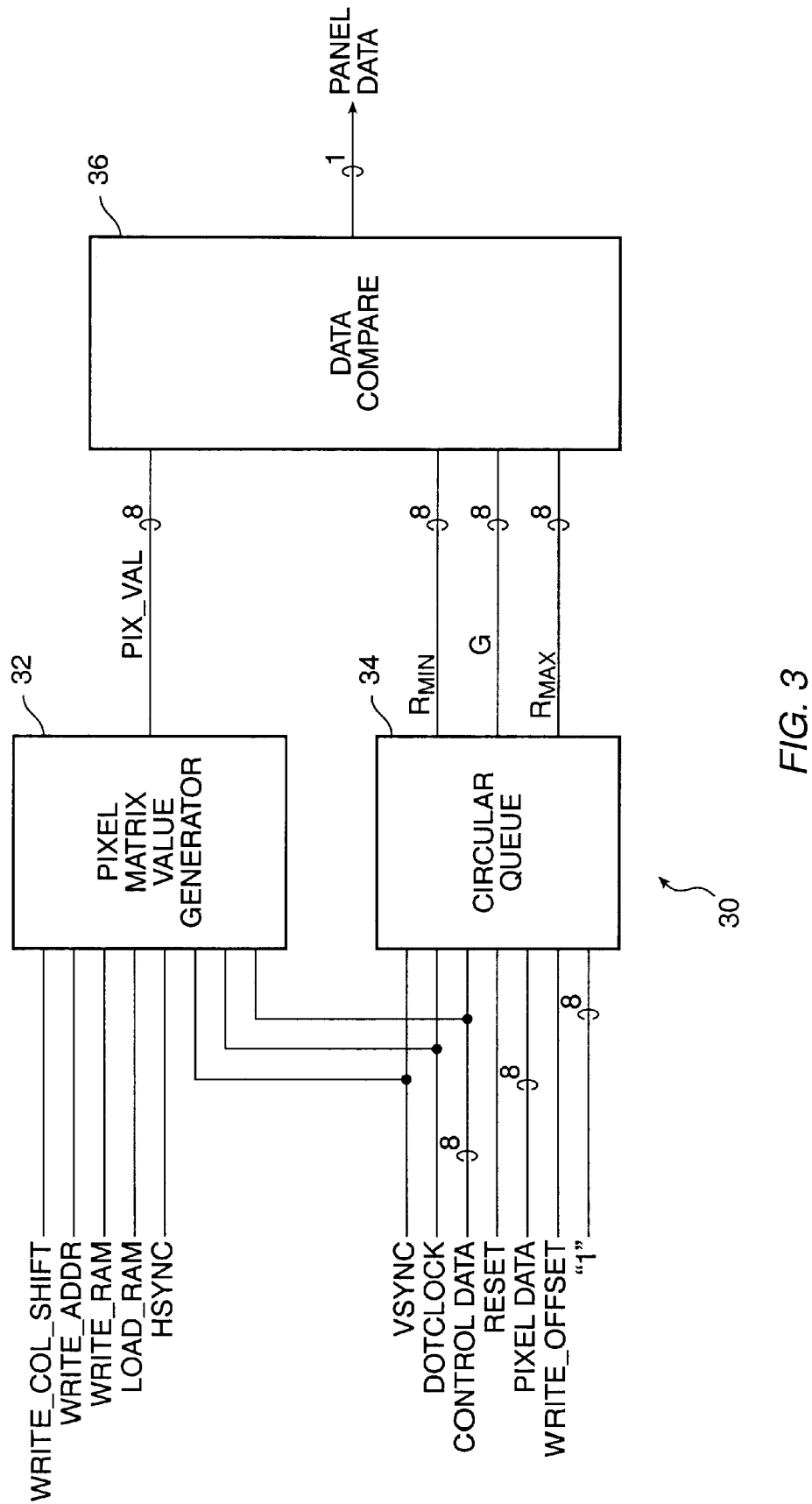
FIG. 3 is a block diagram of a hardware system which may be used to implement the present invention.

Referring now to FIGS. 3 through 10, a block diagram of a hardware system 30 for implementing the present invention is shown. FIG. 3 is a first portion of the block diagram and shows pixel matrix value generator 32, circular queue 34, and data compare unite 36. The following disclosure assumes a 16 by 16 matrix size.

Pixel matrix value generator 32 generates the pixel value PIX_Val which is 8 bits in the presently preferred embodiment of the invention employing a 16×16 matrix. Circular queue 34 generates Rmin and Rmax, the starting and ending bounds of the ON range in the queue for which an individual pixel is to be turned on, as well as G, the grey shade value. Data compare unit 36 evaluates the PIX_VAL and the Rmin and Rmax data from circular queue 34 and generates the signal to turn the current pixel on or off in response thereto. There are several inputs to pixel matrix value generator 32 and circular queue 34.

CONTROL DATA is an eight-bit bus which inputs RAM data, RAM address, column offset value or color offset value into pixel matrix value generator 32 and to circular queue 34. WRITE_COL_SHIFT input is a clock pulse for loading the lower 4-bit CONTROL DATA as a column offset value. WRITE_ADDR is a clock pulse for loading 8-bit CONTROL DATA as an address of the 256×8-bit RAM of FIG. 5 WRITE_RAM is a clock pulse for loading CONTROL DATA as data into the 256×8-bit RAM of FIG. 5. LOAD_RAM selects an address for 256×8-bit RAM. The use of a multipurpose bus like CONTROL DATA and the use of multiple clock signals for capturing data or interest to particular devices on the bus is familiar to those of ordinary skill in the art.

HSYNC is an end-of-line signal and goes high after displaying each line of the current frame. VSYNC is an end-of-frame signal presented to pixel matrix value generator 32 and to circular queue 34, and goes high after displaying all lines of one frame. DOTCLOCK is a clock pulse running at the pixel consumption rate presented to pixel matrix value generator 32 and to circular queue 34 for clocking each pixel value. The combination of DOTCLOCK, HSYNC, VSYNC, and WRITE_COL_SHIFT are used to set the column and row address of the 16×16 matrix as will be disclosed herein. The matrix element is previously downloaded to the 256×8-bit RAM of FIG. 5 by using CONTROL DATA as address and data inputs. Rmin and Rmax is the result from circular quene 34 according the color value of pixel, current frame number and color offset value.

RESET resets the frame counter in circular queue 34 to zero and is asserted prior to initial operation of circular queue 34. PIXEL DATA is the 8-bit color value of the current pixel to be displayed.

WRITE_OFFSET is a clock pulse for loading CONTROL DATA as color offset value. PANEL DATA is the output of data compare unit 36 and is either "1" or "0" which is used to turn the panel pixel "on" or "off". Data compare unit 36 will output "1" if PIX_VAL is greater than or equal to Rmin and less than or equal to Rmax in cases where the queue is not looping. In the case where the queue is looping, data compare unit 36 will output "1" if PIX_VAL is greater than or equal to Rmin and less than or equal to 255 or if PIX_VAL is less than or equal to Rmax and greater than or equal to zero. In the special case where the grey shade value of the pixel is zero, data compare unit 36 will output zero. PIX_VAL is one of the elements of 16×16 matrix.

Figure 4:
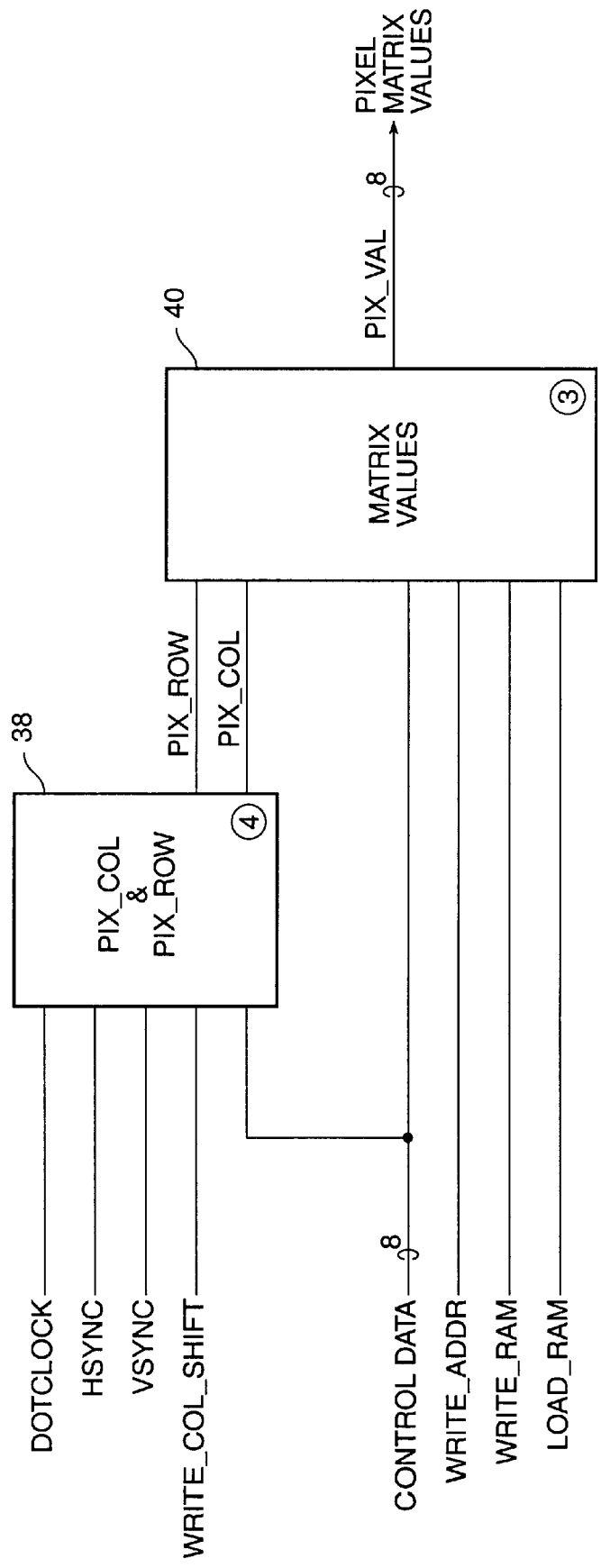
FIG. 4 is a more detailed block diagram of the pixel matrix value generator of FIG. 3.

FIG. 4 is a more detailed block diagram in which the pixel matrix value generator 32 of FIG. 3 is seen to comprise a pixel column and pixel row address generator 38 and pixel matrix address generator 40. The combination of DOTCLOCK, HSYNC, VSYNC, and WRITE_COL_SHIFT inputs to pixel column and pixel row address generator 38 are used to generate the column and row address of the 16×16 matrix as outputs PIX_COL and PIX_ROW. The PIX_COL (column address of 16×16 matrix) and PIX_ROW (row address of 16×16 matrix) are used as addresses for fetching the matrix element from pixel matrix value generator 40 when LOAD_RAM is low. When LOAD_RAM is high CONTROL DATA will be used as data input with WRITE_RAM high to write a 16×16 matrix element to the 256×8-bit RAM (shown in FIG. 5).

Figure 5:
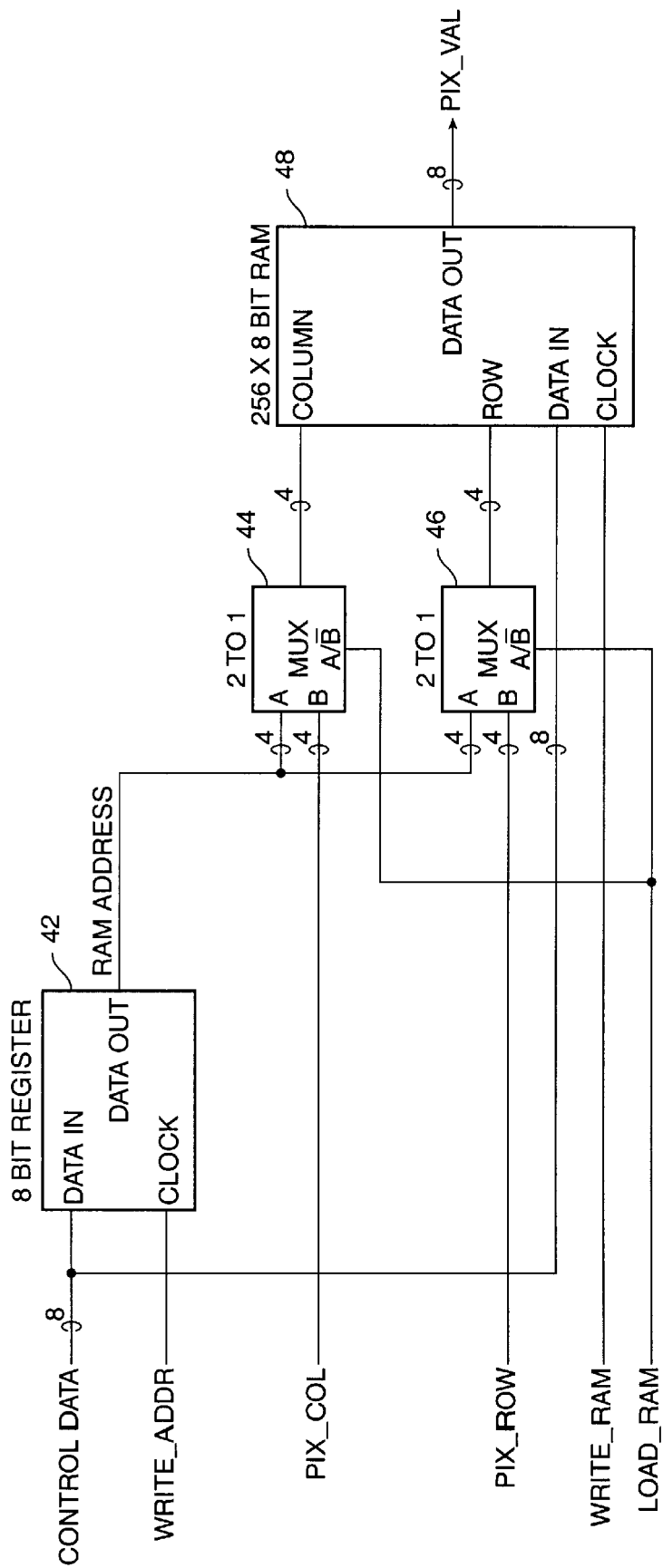
FIG. 5 is a more detailed block diagram of the matrix value block of FIG. 4.

FIG. 5 is a more detailed block diagram of the pixel matrix value generator 40 block of FIG. 4. When WRITE_ADDR is high, the CONTROL DATA input will load 8-bit register 42 with RAM ADDRESS. When LOAD_RAM is HIGH, the RAM ADDRESS will pass through the A inputs of 2:1 multiplexers 44 and 46 as column and row addresses, respectively, for the 256×8-bit RAM 48. CONTROL DATA input will load to the 256×8-bit RAM location indicated by RAM ADDRESS when WRITE_RAM is HIGH. When LOAD_RAM is LOW, the PIX_COL and PIX_ROW data will pass through the B inputs of 2:1 multiplexers 44 and 46 and the PIX_VAL will be valid.

Persons of ordinary skill in the art will observer that a regular matrix loaded into RAM 48 would allow the entirety of FIG. 5 to be reduced to a decoder controlled solely by PIX_COL and PIX_ROW. An irregular matrix contains a near random pattern of values with no relationship to PIX_COL and PIX_ROW. A regular matrix contains values which have a relationship to PIX-COL and PIX_ROW.

Figure 6:
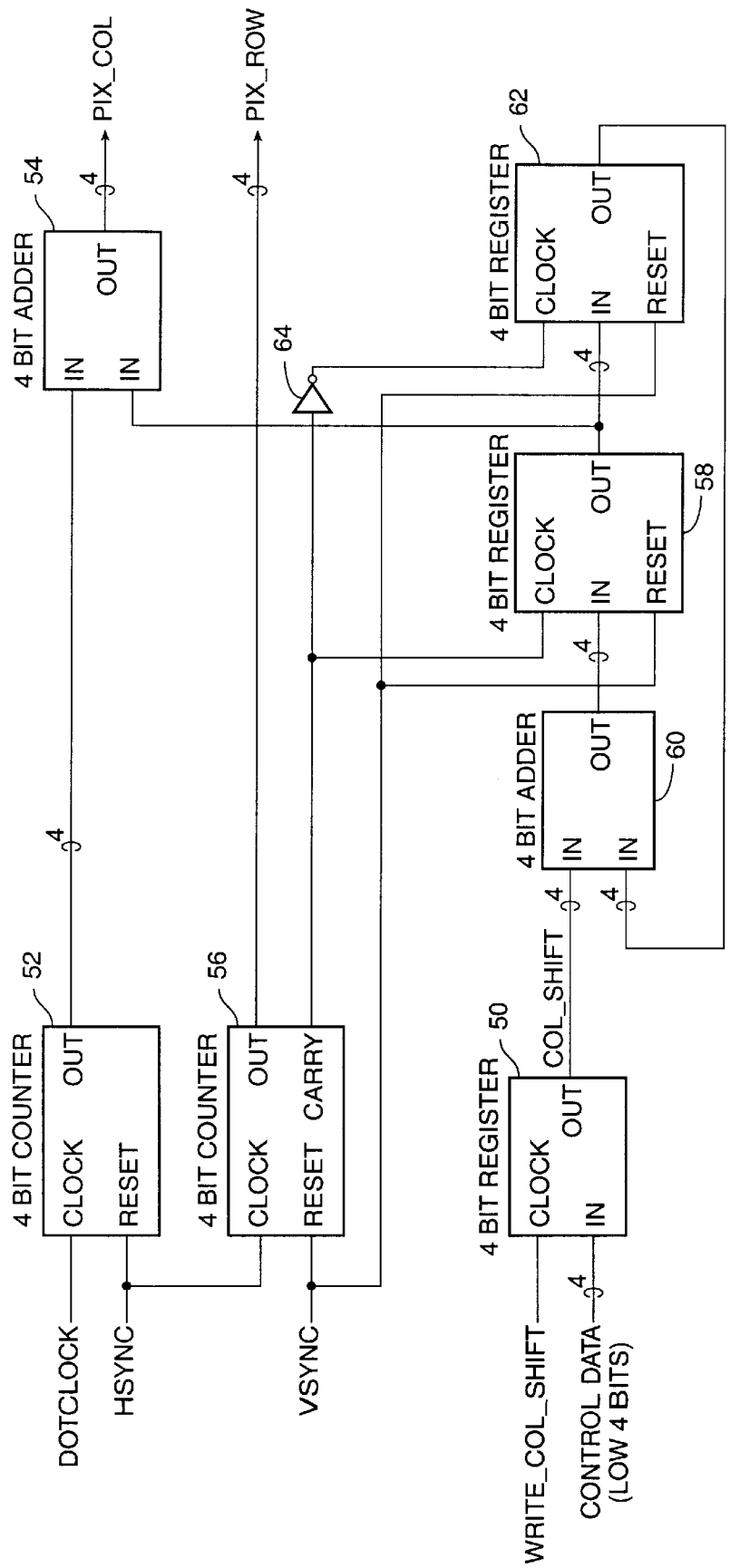
FIG. 6 is a more detailed block diagram of the pixel column and pixel row address generator of FIG. 4.

FIG. 6 is a more detailed block diagram of the pixel column and pixel row address generator 38 of FIG. 4. Every 16 lines vertically down the display frame, the column offset value will be added to the previous accumulated column offset value for the next 16 vertical lines.

The initial column offset value (COL_SHIFT) is loaded to 4-bit register 50 by inputting the lower 4 bits of CONTROL DATA when the WRITE_COL_SHIFT signal at its clock input goes high. Four-bit counter 52 is clocked by the DOTCLOCK signal and its output, representing the raw column number 0–15, is presented to adder 54 whose function is to add the offset value to it to produce the output PIX_COL as will be described herein. Four-bit counter 56 is clocked by the HSYNC signal. The CARRY signal of 4-bit counter 64 will indicate that 16 lines have passed and will clock 4-bit register 58 to provide a new offset value to the 4-bit adder 54.

Four-bit register 50, 4-bit adder 60, 4-bit register 58, and 4-bit register 62 perform the function of incrementing the column offset every 16 lines of each frame. At the beginning of each line of display pixels, HSYNC resets 4-bit counter 52. At the beginning of each frame, VSYNC resets 4-bit register 58, 4-bit register 62, and 4-bit counter 56 to zero. During the first 16 lines in a frame, the zero-value output of 4-bit register 58 is added to the raw column data from 4-bit counter 52, resulting in no offset. During this time the zero-value output of 4-bit register 62 is presented to 4-bit adder 60, causing its output to equal COL_SHIFT.

After the first 16 lines have been counted, the carry output of 4-bit counter 56 clocks the value COL_SHIFT into 4-bit register 58. For the next 16 lines, the 4-bit adder 54 will increment the raw column data from 4-bit counter 52 by the quantity COL_SHIFT. During this time the output of 4-bit register 62, which has now been set to COL_SHIFT by clocking through inverter 64 for synchronization, is presented to 4-bit adder 60, causing its output to equal a value of twice COL_SHIFT.

After the second 16 lines have been counted, the carry output of 4-bit counter 52 clocks the value of twice COL_SHIFT into 4-bit register 58. For the next 16 lines, the 4-bit adder 54 will increment the raw column data from 4-bit counter 56 by the quantity equal to twice COL_SHIFT. During this time the output of 4-bit register 62, which has now been set to twice COL_SHIFT, is presented to 4-bit adder 60, causing its output to equal a value of three times COL_SHIFT.

From the above disclosure, persons of ordinary skill in the art will observe that, for each group of 16 lines of display following the first group of 16 lines, the PIX_COL output will be offset by a value of n times COL_SHIFT, where n is the nth repetition of 16 lines in the frame.

After displaying each line, the HSYNC will again go high and reset the 4-bit counter 52 to zero for the beginning of the next line. Four-bit counter 56 is clocked by the HSYNC signal to produce the output PIX_ROW, a value between 0–15. This counter is reset when VSYNC goes HIGH, indicating the end of a frame.

Figure 7:
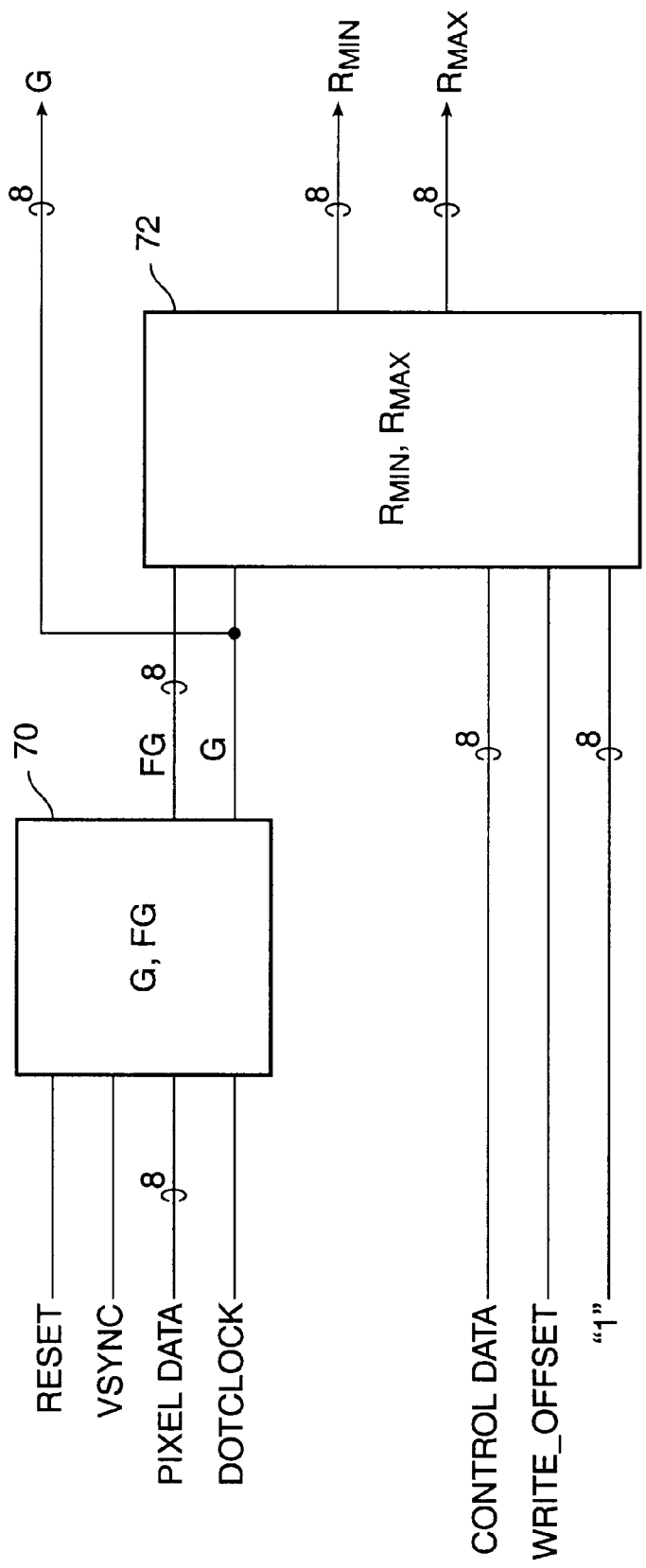
FIG. 7 is a more detailed block diagram of the circular queue of FIG. 3.

FIG. 7 is a more detailed block diagram of the circular queue 34 of FIG. 3. The G,FG unit 70 (G=Gray Shade and FG=Frame Number times Gray Shade) will generate value of gray shade G and value of frame number times gray shade FG. The grey shade is simply the value of the input PIXEL DATA and the value FG is determined from VSYNC as will be more particularly disclosed with reference to FIG. 8 herein.

The value of gray shade G and value of frame number times gray shade FG from G,FG unit 70 are presented to Rmin Rmax generator 72. The offset which will be added add to the boundary values (Rmin and Rmax) is loaded from CONTROL DATA when WRITE_OFFSET goes HIGH. "1" is a constant value which is use for subtracting the value "one" from G (Gray Shade).

Figure 8:
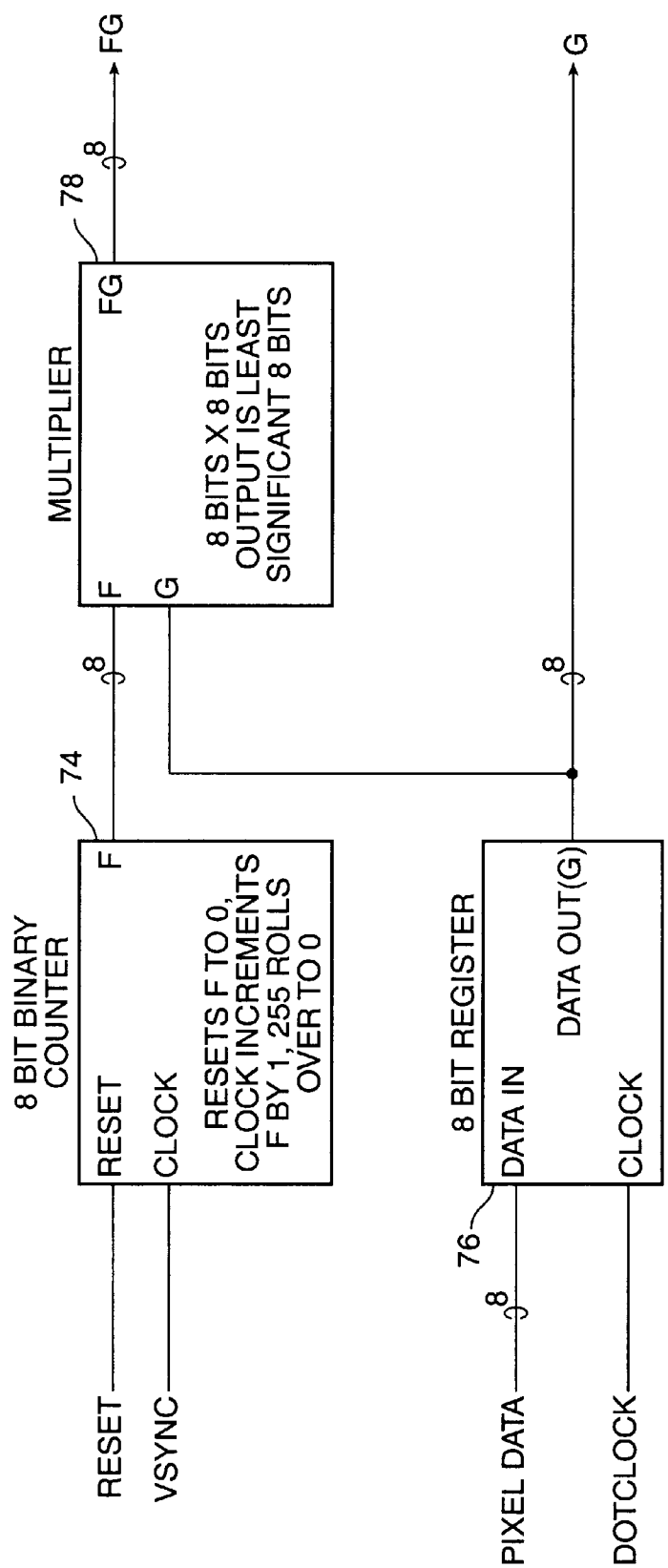
FIG. 8 is a more detailed block diagram of the G,FG unit of FIG. 7.

FIG. 8 is a more detailed block diagram of the G,FG unit 70 of FIG. 7. An 8-bit binary counter 74 will increment F(Frame Number) output by one each time VSYNC goes high, indicating the end of a frame. Counter 74 will roll 255 over to zero. The 8-bit binary counter 74 will be reset to zero when RESET goes high, indicating the start of frame sequence for initial operation. PIXEL DATA (the grey scale value of the current pixel) will be clocked to 8-bit register 76 when DOTCLOCK goes high. The G(Gray Shade) output of register 76 is multiplied by the F(Frame Number) output of 8-bit counter 74 in multiplier 78. The least significant 8-bit output of multiplier 78 is FG(Frame Number times Gray Shade).

Figure 9:
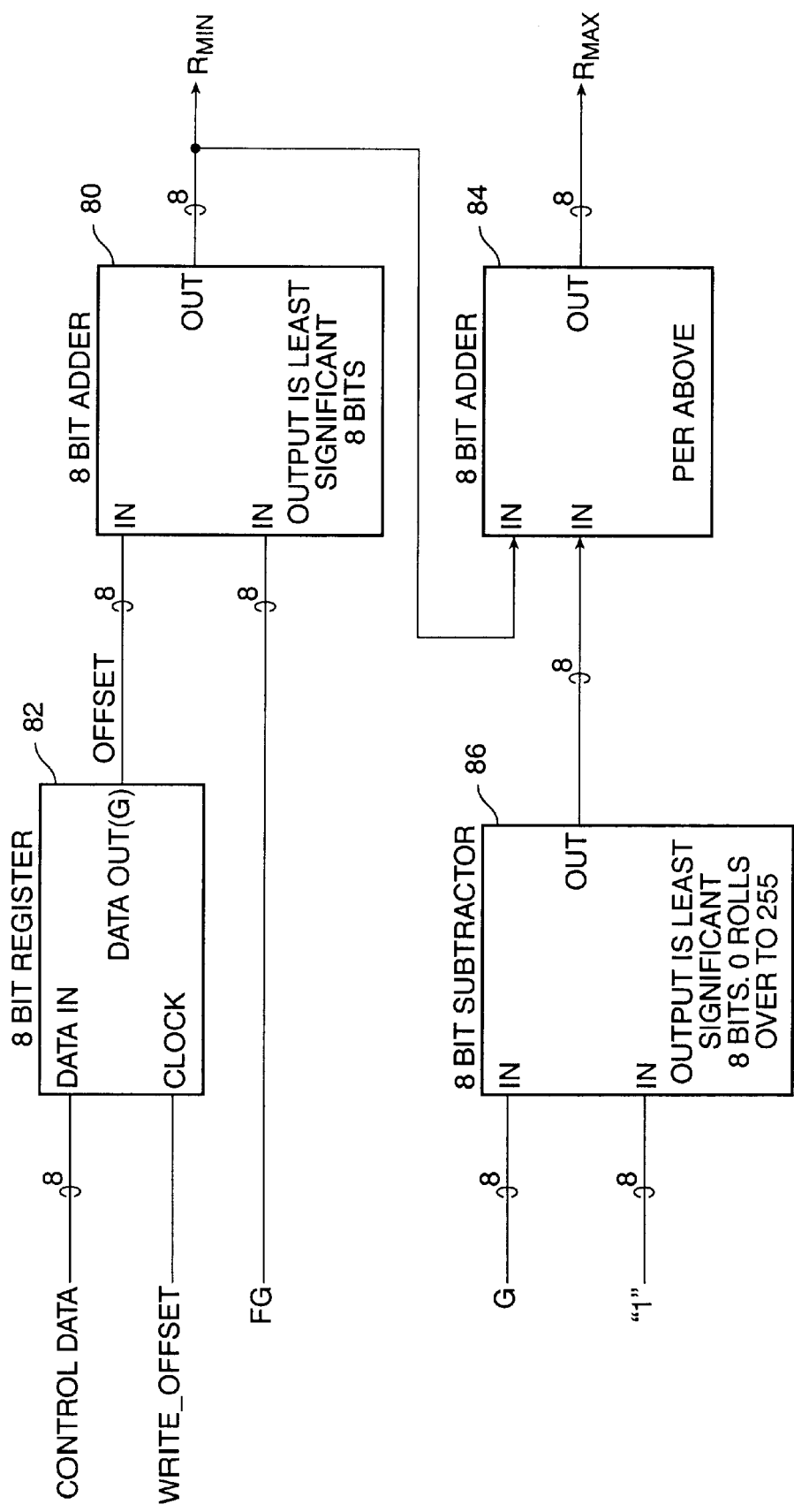
FIG. 9 is a more detailed block diagram of the Rmin Rmax unit of FIG. 7.

FIG. 9 is a more detailed block diagram of the Rmin Rmax unit 72 of FIG. 7. Rmin is generated by adding the FG(Frame Number times Gray Shade) value with the color offset in 8-bit adder 80. The color offset is loaded from CONTROL DATA into 8-bit register 82 with WRITE_OFFSET high.

Rmax is generated by adding Rmin with the quantity G(Gray shade) minus one in 8-bit adder 84. The output of 8-bit adder 84 is the least significant 8 bit result. The output of subtractor is least significant 8 bits result with 0 rolling over to 255. The quantity G(Gray shade) minus one is calculated in subtractor 86.

Figure 10:
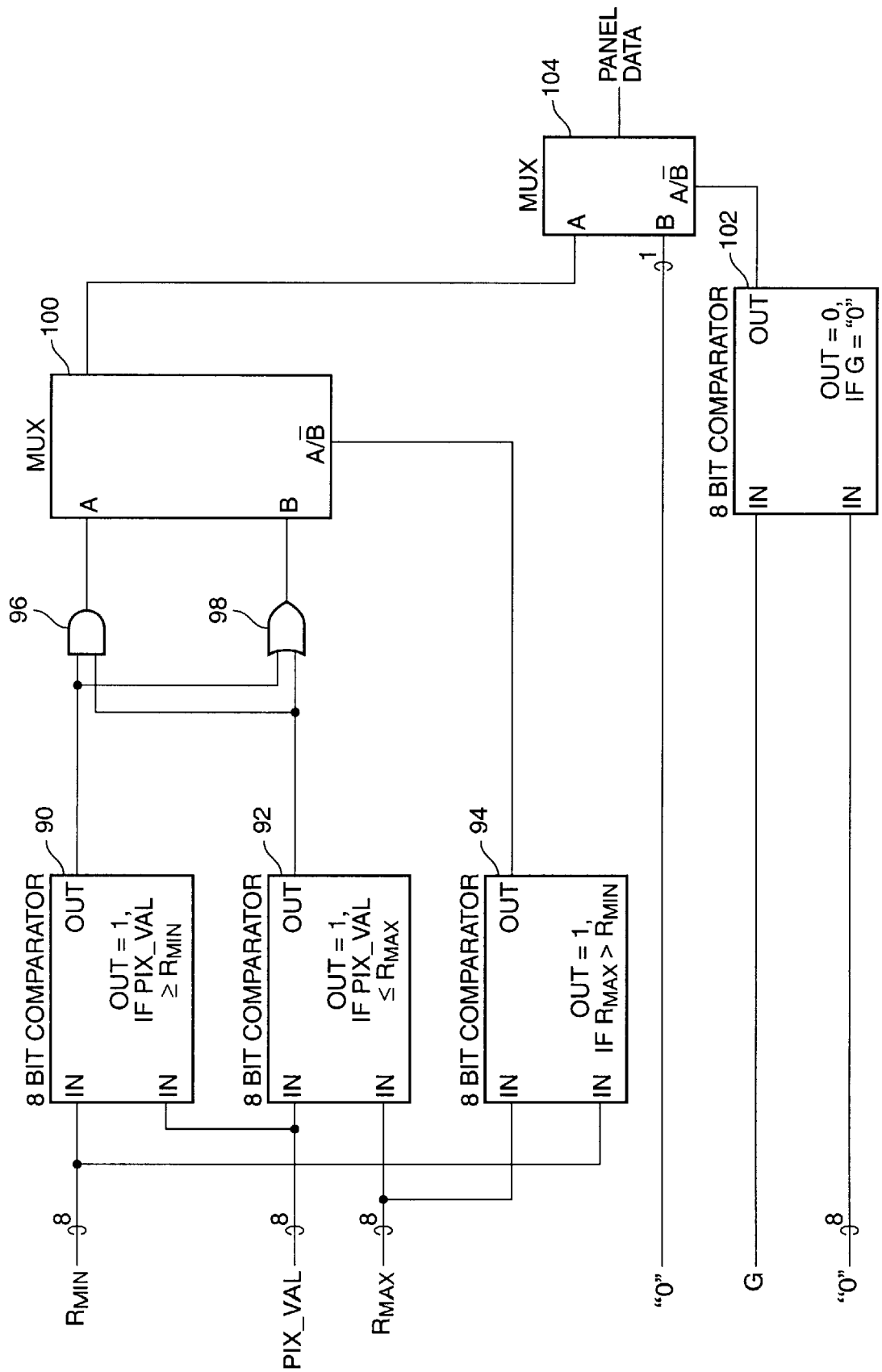
FIG. 10 is a more detailed block diagram of the data compare unit of FIG. 3.

FIG. 10 is a more detailed block diagram of the data compare unit 36 of FIG. 3. The output of a first 8-bit comparator 90 is set to one if PIX_VAL is greater than or equal to Rmin. The output of second 8-bit comparator 92 is set to one if PIX_VAL is less than or equal to Rmax. The output of third comparator 94 is set to zero if Rmax is less than Rmin, a condition which occurs when the circular queue address range loops from 255 to zero.

The output of AND gate 96 is set to one if the outputs of both comparators 90 and 92 are set to one, indicating a pixel in the valid ON range for cases where queue looping is not a consideration. The output of OR gate 98 is set to one if either the output of comparator 90 or 92 is set to one, indicating pixel in the valid ON range for cases where queue looping is a consideration.

If the output of comparator 94 is set to one, queue looping is not occurring, and thus multiplexer 100 passes the output of AND gate 96. If the output of comparator 94 is set to zero, queue looping is occurring, and thus multiplexer 100 passes the output of OR gate 98.

In the special case where the grey shade G of the incoming pixel is zero, comparator 102 causes multiplexer 104 to pass a hardwired zero to its output PANEL DATA. Otherwise, comparator 102 causes multiplexer 104 to pass the output of multiplexer 100 to PANEL DATA. Persons of ordinary skill in the art will recognize that all of the control signals used to drive the circuitry of FIGS. 3 through 10 are readily available or easily generated.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for displaying grey-scale images at a desired grey scale resolution on a display having a super matrix of matrices of pixels, comprising:

defining a plurality of control matrices, each of said control matrices having a size equal to the desired grey scale resolution of the display, each position in each of said control matrices corresponding to a specific pixel of said display;

defining a super matrix, each position in said super matrix corresponding to one of said plurality of control matrices and having an assigned number in a range equal to the desired grey scale resolution;

turning on a selected number of pixels within each of said control matrices based upon the grey scale value of the pixel, the orientation of the pixels turned on based on the value of a circular queue of size equal to said desired gray scale resolution; and adjusting the starting value of said circular queue for each of said control matrices based upon the number contained in the position of the super matrix corresponding to each control matrix and the gray scale value of the pixel.

2. The method of claim 1 wherein said defining a plurality of control matrices includes assigning each position in each of said plurality of control matrices a value in a range equal to the desired gray scale resolution.

3. The method of claim 2 wherein said turning on includes comparing said control matrix value of each pixel in a frame of an image to be displayed on said display to an ON range and turning that pixel on if the control matrix value of that pixel is within said ON range, said ON range being equal in size to the grey scale value of that pixel and contained in a circular queue having a size equal to said desired grey scale resolution.

4. The method of claim 3 further including changing said ON range in said circular queue for each successive frame.

5. The method of claim 4 wherein changing said ON range in said circular queue for each successive frame comprises changing said range by an amount equal to the grey scale value of the pixel to be displayed.

6. The method of claim 4 wherein each grey scale value for each incoming pixel includes a plurality of color components, and wherein comparing said control matrix value of each pixel in a frame of an image to be displayed on said display to an ON range, turning that pixel on if the control matrix value of that pixel is within said ON range and changing the ON range in said circular queue for each successive frame by an amount sufficient to ensure that ON ranges for successive frames are non overlapping comprise separately performing these steps for each color component.

7. The method of claim 6 wherein the ON ranges for said plurality of color components are offset from one another in each frame.

8. A method for displaying grey-scale images at a desired grey scale resolution on a display having a super matrix of matrices of pixels, comprising:

defining a plurality of control matrices, each of said control matrices having a size equal to the desired grey scale resolution of the display, each position in each of said control matrices having an assigned value in the range of the desired gray scale resolution of the display, each position in each of said control matrices corresponding to a specific pixel of said display;

defining a super matrix, each position in said super matrix corresponding to one of said plurality of control matrices and having an assigned number in a range equal to the desired grey scale resolution;

turning on a selected number of pixels within each of said control matrices based upon the grey scale value of that pixel, the orientation of the pixels turned on based on whether each of said in each of said control matrices is within an ON range contained within a circular queue of size equal to said desired gray scale resolution, said ON range beginning at a value Rmin equal to (FG+S+ Offset) modulo N and ending at a value Rmax equal to (Rmin+(G−1)) modulo N, where F is the frame number, G is the gray scale value of the current pixel, S is the starting value of said circular queue and N is the desired gray scale resolution of the display; and adjusting the starting value of said circular queue for each of said control matrices based upon the number contained in the position of the super matrix corresponding to each control matrix and the gray scale value of the pixel.

9. The method of claim 8 further including recalculating said ON range for a specific matrix if the gray scale value of the pixel changes.

10. The method of claim 8 wherein each grey scale value for each incoming pixel includes a plurality of color components, and wherein said turning on comprises separately performing said turning on for each color component.

11. The method of claim 10 wherein said offset is changed for each of said plurality of color components.

12. A method for displaying grey-scale images at a desired grey scale resolution on a display having a matrix of pixels, comprising:

defining a control matrix, said control matrix having a size equal to the desired grey scale resolution of the display, each position in said control matrix corresponding to a specific pixel of said display;

defining a super matrix, each position in said super matrix corresponding to one of said plurality of control matrices and having an assigned number in a range equal to the desired grey scale resolution;

turning on a selected number of pixels within said control matrix based upon the desired grey scale value, the orientation of the pixels turned on based upon value of a circular queue of size equal to said desired gray scale resolution; and adjusting the starting value of the circular queue based upon the gray scale value of the incoming pixel.

13. The method of claim 12 wherein said defining includes assigning each position a value in a range equal to the desired gray scale resolution.

14. The method of claim 13 wherein said turning on includes comparing said control matrix value of each pixel in a frame of an image to be displayed on said display to an ON range and turning that pixel on if the control matrix value of that pixel is within said ON range, said ON range being equal to the grey scale value of that pixel and contained in a circular queue having a size equal to said desired grey scale resolution.

15. The method of claim 14 further including changing said ON range in said circular queue for each successive frame.

16. The method of claim 15 wherein said step of changing said ON range in said circular queue for each successive frame comprises changing said ON range by an amount equal to the grey scale value of the pixel to be displayed.

17. The method of claim 15 wherein each grey scale value for each incoming pixel includes a plurality of color components, and wherein comparing control matrix value of each pixel in a frame of an image to be displayed on said display to an ON range and turning that pixel on if the control matrix value of that pixel is within said ON range and changing said ON range in said circular queue for each successive frame comprises separately performing these procedures for each color component.

18. The method of claim 17 wherein said ON ranges for said plurality of color components are offset from one another in each frame.

19. A method for displaying grey-scale images at a desired grey scale resolution on a display having a matrix of pixels, comprising:

defining a control matrix, said control matrix having a size equal to the desired grey scale resolution of the display, each position in said control matrix corresponding to a specific pixel of said display;

turning on a selected number of pixels within each of said control matrices based upon the grey scale value of that pixel, the orientation of the pixels turned on based on whether each value in each of said control matrices is within an ON contained within a circular queue of size equal to said desired gray scale resolution, said ON range beginning at a value Rmin equal to (FG+S+ Offset) modulo N and ending at a value Rmax equal to (Rmin+(G−1)) modulo N, where F is the frame number, G is the gray scale value of the current pixel, S is the starting value of said circular queue and N is the desired gray scale resolution of the display; and adjusting the starting value of the circular queue based upon the gray scale value of the incoming pixel.

20. The method of claim 19 further including recalculating said ON range for a specific matrix if the gray scale value of the pixel changes.

21. The method of claim 19 wherein each grey scale value for each incoming pixel includes a plurality of color components, and wherein the turning on comprises separately performing said turning on for each color component.

22. The method of claim 21 wherein said offset is changed for each of said plurality of color components.

23. A method for displaying grey-scale images at a desired grey scale resolution on a display having a super matrix of matrices of pixels, comprising the steps of:
- defining a plurality of control matrices, each of said control matrices having a size equal to the desired grey scale resolution each position in each of said control matrices corresponding to a specific pixel of said display;
- defining a super matrix, each position in said super matrix corresponding to one of said plurality of control matrices and having an assigned number in a range equal to the desired grey scale resolution;
- turning on a selected number of pixels within each of said control matrices based upon the grey scale value of the pixel, the orientation of the pixels turned on based on the value of a circular queue of size equal to said desired gray scale resolution; and
- adjusting the starting value of said circular queue for each of said control matrices based upon the number contained in the position of the super matrix corresponding to each control matrix and the gray scale value of the pixel.

24. The method of claim 23 wherein said defining a plurality of control matrices includes assigning each position in each of said plurality of control matrices a value in a range equal to the desired gray scale resolution.

25. The method of claim 24 wherein said turning on includes comparing said control matrix value of each pixel in a frame of an image to be displayed on said display to ON ranges and turning that pixel on if the control matrix value of that pixel is within an ON range, said ON range being equal to the grey scale value of that pixel and contained in a circular queue having a size equal to said desired grey scale resolution.

26. The method of claim 25 further including changing said ON range in said circular queue for each successive frame.

27. The method of claim 26 wherein changing said ON range in said circular queue for each successive frame comprises changing said range by an amount equal to the grey scale value of the pixel to be displayed.

28. The method of claim 26 wherein each grey scale value for each incoming pixel includes a plurality of color components, and wherein the comparing and turning on comprise separately performing these procedures for each color component.

29. The method of claim 28 wherein the ON ranges for said plurality of color components are offset from one another in each frame.

30. A method for displaying grey-scale images at a desired grey scale resolution on a display having a super matrix of matrices of pixels, comprising:
- defining a plurality of control matrices, each of said control matrices having a size equal to the desired grey scale resolution, display each position in each of said control matrices containing a value in the range of the desired gray scale resolution of the display, each value corresponding to a specific pixel of said display;
- defining a super matrix, each position in said super matrix corresponding to one of said plurality of control matrices and having an assigned number in a range equal to the desired grey scale resolution;
- turning on a selected number of pixels within each of said control matrices based upon the grey scale value of that pixel, the orientation of the pixels turned on based on whether each of said values in each of said control matrices is within an ON range contained within a circular queue of size equal to said desired gray scale resolution, said ON range beginning at a value Rmin equal to $(FG+S_m+S_s+\text{Offset})$ modulo N and ending at a value Rmax equal to $(\text{Rmin}+(G-1))$ modulo N, where F is the frame number, G is the gray scale value of the current pixel, $S_m$ is the component of the starting value of said circular queue as affected by the position in said super matrix, $S_s$ is the component of the starting value of said circular queue as affected by the gray scale value of the incoming pixel, and N is the desired gray scale resolution; and
- adjusting Sm for each of said plurality of matrices based upon the number contained in the position of the super matrix corresponding to each control matrix, and adjusting Ss for each of said plurality of matrices based upon the gray scale value the incoming pixel.

31. The method of claim 30 further including recalculating said ON range for a specific matrix if the gray scale value of the pixel changes.

32. The method of claim 30 wherein each grey scale value for each incoming pixel includes a plurality of color components, and wherein the turning on step comprises separately performing the turning on for each color component.

33. The method of claim 32 wherein said offset is changed for each of said plurality of color components.

* * * * *